Dec. 20, 1960  G. E. CHAMBERS  2,965,046
TRANSPORTATION EQUIPMENT
Filed June 16, 1958
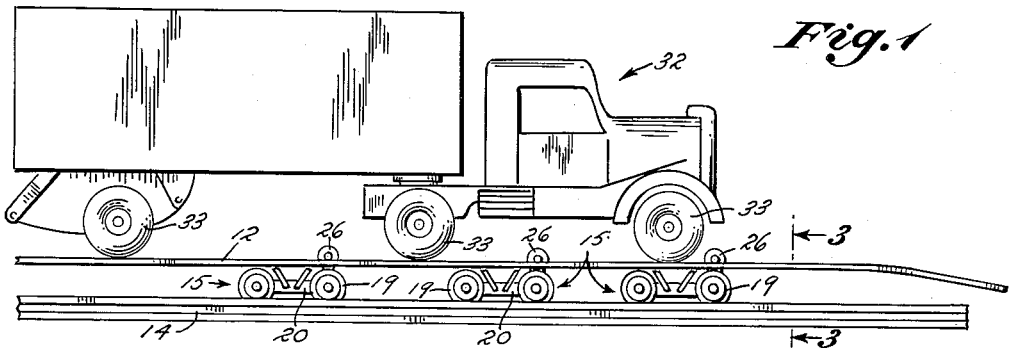
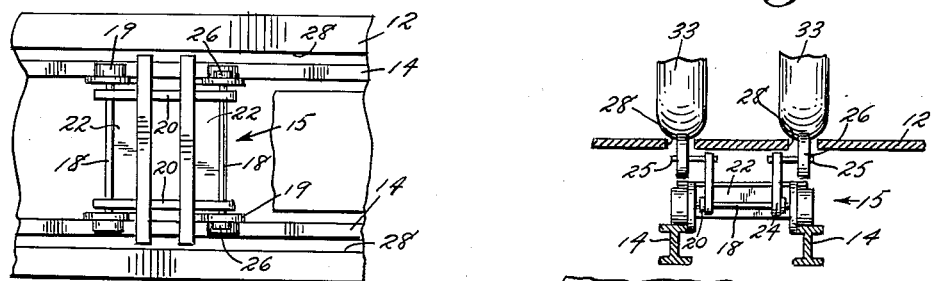
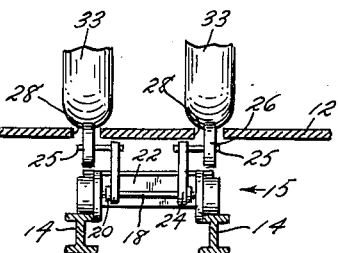
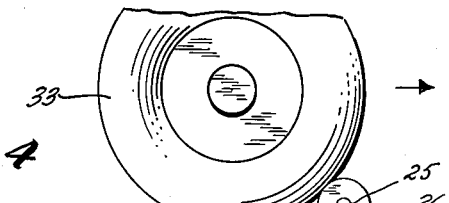
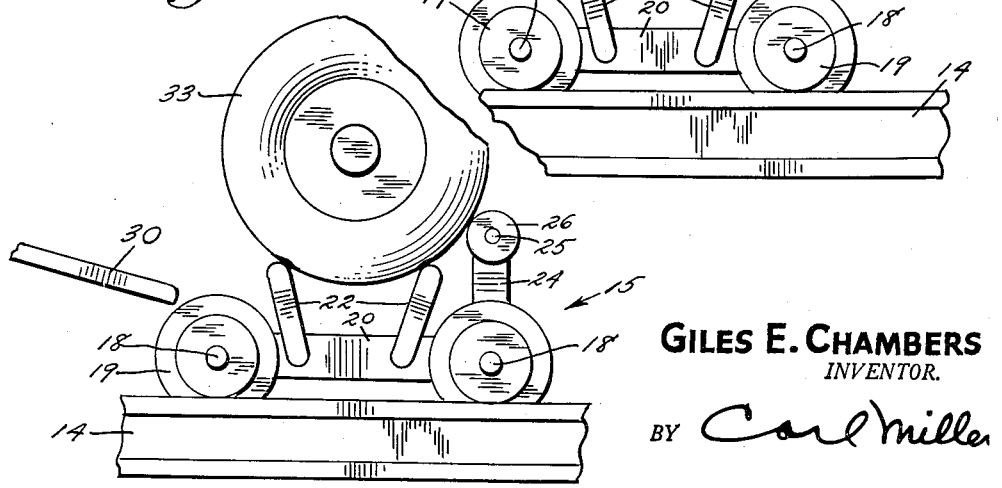
GILES E. CHAMBERS
*INVENTOR.*
BY *Carl Miller*
ATTORNEY

United States Patent Office 2,965,046
Patented Dec. 20, 1960

2,965,046
TRANSPORTATION EQUIPMENT

Giles E. Chambers, 40 Labelle Ave., Highland Park, Mich.

Filed June 16, 1958, Ser. No. 742,131

2 Claims. (Cl. 105—215)

This invention relates to transportation equipment and, more particularly, to a device for transporting land vehicles on rails.

It is an object of the present invention to provide apparatus for mounting a land vehicle body, such as a tractor and trailer upon a trackway for movement there along which will assure the proper positioning of the land vehicle wheels centrally upon the supporting trackway.

Another object of the present invention is to provide carriage means for supporting the wheels of a land vehicle upon a trackway for movement there along at a substantially high rate of speed and in a safe and efficient manner.

Still another object of the present invention is to provide transportation equipment of the type described which is extremely simple in construction, efficient in operation, and which will enable the vehicle to be mounted and dismounted in a minimum amount of time and without the necessity of additional equipment or men.

Other objects of the invention are to provide transportation equipment bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of transportation equipment made in accordance with the present invention in operative use;

Figure 2 is a top plan view, with parts broken away, of certain parts of the present invention;

Figure 3 is a transverse cross sectional view taken along line 3—3 of Figure 1;

Figure 4 is an enlarged fragmentary side elevational view of certain parts of the present invention in an initial loading position; and Figure 5 is a view similar to Figure 4, showing the parts in a vehicle supporting position.

Referring now to the drawing, and more particularly to Figures 1 and 2 thereof, transportation equipment 10 made in accordance with the present invention is shown to include a loading platform 12 having a pair of rails 14 therebeneath defining a trackway along which the vehicle is to be propelled. A plurality of individual carriages 15 are rollably supported upon the rails 14. Each such carriage 15 includes a pair of axles 18 having flanged wheels 19 secured to each end.

Each pair of axles 18 is secured in spaced apart parallel relationship by means of longitudinally extending side frames 20. The forward end of each pair of side frames 20 adjacent to the front axle 18 of the carriage supports a pair of upwardly extending posts 24. Each such post 24 has a transversely extending shaft 25 at its free end that rotatably supports a guide roller 26. The platform 12 is provided with a pair of spaced apart parallel slots 28 through which these guide rollers 26 extend into the path of movement of the wheels 33 of a land vehicle 32. A pair of upwardly diverging plates 22 are also secured to each pair of side frames 20, as is more clearly shown in Figure 4, to form a cradle for receiving a pair of the wheels 33 of the vehicle, as will hereinafter be more fully explained.

In actual use, the vehicle is driven onto the platform 12 in the manner shown in Figure 1. With a separate carriage 15 disposed beneath the vehicle, one for each pair of wheels 33 thereof, the vehicle is started moving in a forward direction toward a downwardly inclined section 30. As the wheels 33 of the vehicle abut the guide rollers 26 of each carriage, the vehicle causes the carriages to move longitudinally along the rails 14 with the upwardly diverging cradle plates 22 directly beneath the respective land vehicle wheels. As the wheels of the land vehicle then move downwardly along the downwardly inclined section 30, as is more clearly shown in Figure 5 of the drawing, the wheels 33 of the land vehicle are slowly guided into supported engagement upon the upwardly diverging plates 22 at the point that the level of the inclined section 30 extends below the upper level of the cradle plates 22. As each pair of vehicle wheels 33 is supported upon the respective carriage 15, the land vehicle is ultimately completely supported upon the trackway rails 14 for movement there along. These land vehicles may then be hitched together to form a train or may be propelled individually under separate power means, or may be provided with a drive connection between the drive wheels of the tractor and the associated carriage, such as by the use of pulleys, friction rolls, or the like. Whenever it is desired to remove the vehicle from the carriages for ues upon a highway, it is only necessary to direct the carriages into an unloading station substantially the same as that illustrated in Figure 1, wherein an upwardly inclined plane is provided for slowly elevating the wheels of the land vehicle from the level of the cradle plates 22 and upon a loading platform 12.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Apparatus for loading and transporting land vehicles upon railway tracks comprising, in combination, a trackway, a platform supported above said trackway, an independent carriage for each vehicle wheel and axle assembly rollably supported upon said trackway intermediate said trackway and said platform and movable along said trackway independently of each other, guide means positioning said carriages beneath said vehicle wheel and axle assemblies, crade means upon each carriage receiving the associated land vehicle wheel, said trackway comprising a pair of spaced apart parallel rails, each said carriage comprising a pair of axles, a flanged wheel secured to the end of each of said axles, and side frames rotatably supporting said axles in spaced apart parallel relationship, said guide means comprising a pair of guide rollers rotatably supported upon one of said axles one above each flanged wheel thereof, and said platform defining a pair of longitudinal slots in spaced parallel relationship one above each said rails receiving said guide rollers therethrough, and said guide rollers projecting upwardly above the level of said platform for engagement by the wheels of the land vehicle.

2. Apparatus for loading and transporting land vehicles as set forth in claim 1, wherein said cradle means comprises a pair of upwardly diverging plates for receiving a pair of land vehicle wheels, and said platform includes a downwardly inclined section lowering the wheels of the land vehicle into said cradle means.

References Cited in the file of this patent

UNITED STATES PATENTS

| | | |
|---|---|---|
| 204,087 | Ramsey | May 21, 1878 |
| 210,051 | Post | Nov. 19, 1878 |
| 1,506,849 | Mancha | Sept. 2, 1924 |
| 1,994,815 | Ferrin | Mar. 19, 1935 |
| 2,414,383 | Merriam | Jan. 14, 1947 |

FOREIGN PATENTS

| | | |
|---|---|---|
| 800,428 | Germany | Nov. 6, 1950 |